(12) United States Patent  
Gahn et al.

(10) Patent No.: US 7,134,338 B2  
(45) Date of Patent: Nov. 14, 2006

(54) SENSOR WITH SYMMETRICAL LIMITING OF A SIGNAL

(75) Inventors: Christoph Gahn, Stuttgart (DE); Dirk Droste, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/996,224

(22) Filed: Nov. 23, 2004

(65) Prior Publication Data

US 2005/0126288 A1 Jun. 16, 2005

(30) Foreign Application Priority Data

Dec. 11, 2003 (DE) ................. 103 57 870

(51) Int. Cl.  
*G01P 15/13* (2006.01)  
*G01P 15/125* (2006.01)  
*G01P 9/04* (2006.01)

(52) U.S. Cl. ............... 73/514.18; 73/514.32; 73/1.38; 73/504.12

(58) Field of Classification Search ............. 73/514.32, 73/514.17, 514.18, 514.29, 514.38, 1.38, 73/504.04, 504.12, 504.14, 504.15  
See application file for complete search history.

(56) References Cited

U.S. PATENT DOCUMENTS

| 5,481,914 A * | 1/1996 | Ward .................. 73/504.16 |
| 6,530,275 B1 * | 3/2003 | Hollocher et al. ....... 73/514.18 |
| 6,601,431 B1 * | 8/2003 | Nagahara et al. ........... 73/1.38 |
| 6,666,092 B1 * | 12/2003 | Zarabadi et al. ......... 73/514.02 |
| 6,691,572 B1 * | 2/2004 | Handrich ............... 73/514.18 |

* cited by examiner

*Primary Examiner*—Helen Kwok  
(74) *Attorney, Agent, or Firm*—Kenyon & Kenyon LLP

(57) ABSTRACT

A sensor having a seismic mass and having an arrangement for detecting the deflection of the mass and converting it into an electrical signal; in at least one operating mode of the sensor, a mechanical stop asymmetrically limiting the deflection of the seismic mass with respect to a vibrational center position. An arrangement for symmetrical limiting of the signal provided on the sensor.

9 Claims, 3 Drawing Sheets

Prior Art

SENSOR WITH SYMMETRICAL LIMITING OF A SIGNAL

BACKGROUND INFORMATION

Accelerations in motor vehicles, particularly in their airbag control units, are measured using micromechanical inertial sensors. In so doing, the principle of the differential capacitor is used, in which a movable seismic mass, together with fixed reference electrodes, forms two capacitances. If an acceleration acts on the mass, it is deflected and the capacitances change. The difference in the capacitances is converted by an electronic circuit, a so-called capacitance/voltage converter (C/U converter), into a voltage signal essentially proportional to the acceleration. The movable structures and the capacitor-like arrangements, which form the capacitances, are usually implemented as microelectromechanical structures (MEMS).

The precise centering of the seismic mass between the fixed electrodes represents a problem when manufacturing the inertial sensors in the construction as MEMS. As a rule, the actual position of the seismic mass deviates from the desired central position due to process uncertainties. This displacement leads to a capacitive signal which is not owing to a deflection of the mass as a result of an influencing acceleration, and which is usually compensated for by an electrical circuit. To that end, the deviation is electrically measured when switching on the sensor and is continually subtracted from the output signal during operation.

During normal operation, the seismic mass of the inertial sensor is induced by accelerations to movements having a certain amplitude and in part high frequency.

In unusual operating states, e.g. when the sensor is subjected to strong impacts in the provided deflection direction of the seismic mass, the amplitude can be very much greater. To prevent contact of the electrodes and therefore an electrical collapse, mechanical stops are provided which limit the deflection of the seismic mass. Because of the circumstance that the position of rest or vibrational center position of the seismic mass deviates from the geometric center position between the stops, an asymmetrical limiting of the sensor signal occurs, resulting in a faulty signal at the sensor output.

SUMMARY OF THE INVENTION

The present invention is based on a sensor having a seismic mass and at least one mechanical stop. The sensor has means for detecting the deflection of the vibrating mass and converting it into an electrical signal. At least one operating mode of the sensor exists in which the deflection of the seismic mass is limited asymmetrically by the stop with respect to a vibrational center position.

An essence of the present invention is that means are provided for limiting the maximum value of the electrical signal, the limiting being symmetrical with regard to the time average of the signal, and the maximum value of the electrical signal not being greater than the smallest value predefined by the mechanical stop.

The sensor of the present invention has the advantage that an asymmetrical limiting of the signal is replaced by a symmetrical limiting. Under certain conditions during operation, such as, for example, the influence of broken stone or spray water, the deflection of the seismic mass represents a periodic signal whose time average is essentially constant. If the deflection were limited asymmetrically, the average value would be changed. After a subsequent filtering in the signal path, this altered value would be interpreted falsely as a very great constant acceleration acting on the sensor. On the other hand, if the signal is limited symmetrically, then the average value is retained in comparison to a vibrator which is not limited by a stop.

In one advantageous embodiment of the sensor according to the present invention, means for determining the deviation of the vibrational center position of the seismic mass from the geometric center are provided on the sensor. In principle, the deviation of the position of rest or vibrational center position of the seismic mass from the geometric center between the stops or the detection means can already be determined after the sensor is manufactured. However, this deviation may change due to ageing or changing environmental conditions. Consequently, the time average of the signal in the case of high-frequency, large accelerations also changes. To determine the time average of the signal as precisely as possible, it is determined upon switching on the sensor. Proceeding from that, the limits for the symmetrical signal limiting are then provided.

It is also advantageous that the sensor has a micromechanical construction. Based on their construction and their manufacturing technology, owing to process uncertainties, micromechanical sensors exhibit to a considerable degree the above-described deviation of the actual position of rest or center position of the seismic mass, specific to its deflections by outer forces, from the desired, geometric center position. The symmetrical signal correction described is particularly effective here. Moreover, micromechanical structures, electrical sensors and microelectronic evaluation circuits can advantageously be integrated in one common component.

One advantageous development of the sensor according to the present invention is that the means for detecting the deflection take the form of electrodes which represent a capacitive detecting element, particularly according to the principle of differential capacitance. This is a simple and proven principle for measuring deflections when working with micromechanical acceleration sensors and rotation-rate sensors. The variable capacitance can be easily measured using an electronic evaluation circuit connected thereto, and the electrical measured values obtained may easily be further processed.

In one particularly advantageous refinement, the means for limiting the maximum value of the electrical signal are represented by an electronic evaluation circuit. The electrical limiting of the maximum values of the electrical signal is advantageously carried out in a simple manner in an electronic evaluation circuit.

In one advantageous embodiment, a further stop is provided that is able to be variably positioned. In this case, the means for limiting are provided in such a way that they suitably position at least the further stop so that the deflection of the vibrating mass is symmetrically limited. For example, the stop may be positioned using a piezo element by applying a voltage to the latter.

Advantageously, the sensor is an inertial sensor, particularly an acceleration sensor or rotation-rate sensor. Sensors of this type are used in vehicles, where they are subjected to particularly high stresses with respect to impacts and temperature changes as well as other environmental influences.

DETAILED DESCRIPTION

Figure 1:
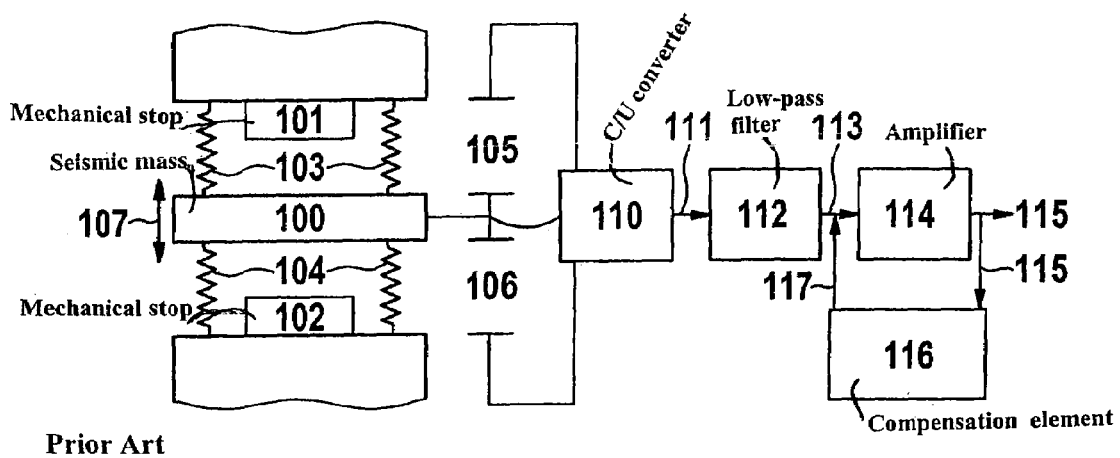
FIG. 1 shows an inertial sensor according to the related art.

FIG. 1 shows an inertial sensor according to the related art. A seismic mass 100 is suspended by a system of springs 103, 104 in a manner allowing vibration. The deflection or vibration of seismic mass 100 induced by an external force takes place in a direction 107. The maximum possible deflection of mass 100 is limited in this example by two mechanical stops 101 and 102. Movable mass 100 represents a movable electrode, and together with two fixed reference electrodes, forms two capacitances 105 and 106. Capacitances 105 and 106 change as a function of the deflection of the mass along direction 107. The detecting element operates according to the principle of differential capacitance. The difference of capacitances 105 and 106 is converted in a capacitance/voltage converter (C/U converter) 110 into a voltage signal 111 essentially proportional to the acceleration. Voltage signal 111 is filtered in a low-pass filter 112 which, for example, may be a filter with switched capacitances (S/C filter—switched capacity (capacitance) filter). Filtered voltage signal 113 is amplified in an amplifier stage 114. An amplified voltage signal 115 is present at the sensor output. Because of the deviation of the vibrational center position of seismic mass 100 from the geometric center position between the reference electrodes, and because of further electrical influences, voltage signal 115, without the influence of an external acceleration on the sensor, is not zero, but rather has an offset. Compensation is made for this offset by offset-compensation circuit 116. To that end, voltage signal 115 is supplied to compensation circuit 116. At the beginning of sensor operation, the offset is determined when there is no external acceleration, and a signal 117 is supplied to amplifier 114 in such a way that signal 115 is compensated to zero. Consequently, the sensor is calibrated for further operation with respect to the offset.

Figure 2A:
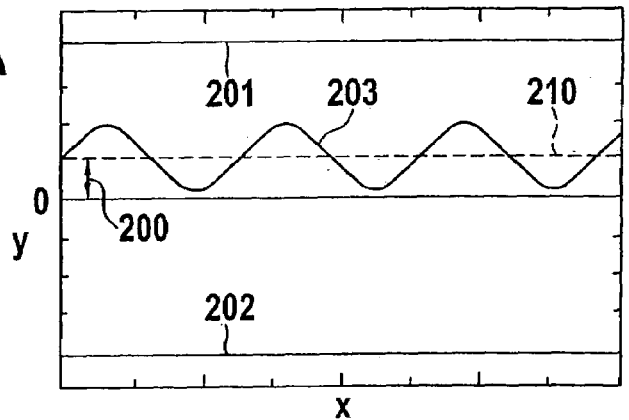
FIG. 2A shows the vibration signal of an inertial sensor in response to high-frequency external excitation.

FIG. 2A illustrates the vibration signal of an inertial sensor in response to high-frequency external excitation. The vibration signal results from a high-frequency acceleration. The time is plotted in any units as desired on axis X. Voltage signal 111 at the output of C/U converter 110 is plotted on axis Y. Signal curve 203 results in response to high-frequency excitation of sensor element 100 with low amplitude. This represents a first, proper operating state of the sensor. Function 203 has turning points which identify a vibrational center position 210 of seismic mass 100. Vibrational center position 210 has an offset 200 with respect to zero line 0 of the diagram. Zero line 0 represents the geometric center position between the reference electrodes. Thus, offset 200 is accounted for in the deviation of vibrational center position 210 of seismic mass 100 from the geometric center position between the reference electrodes. Lines 201 and 202 mark the maximum possible values of function 203 caused by the limitation of the deflection of seismic mass 100 by stops 101 and 102. In a sensor according to FIG. 1, offset 200 and additional electrical influences from low-pass filter 112 and amplifier 114 are compensated for by compensation element 116, and filtered signal 115 is equal to zero, given the absence of low-frequency external accelerations.

Figure 2B:
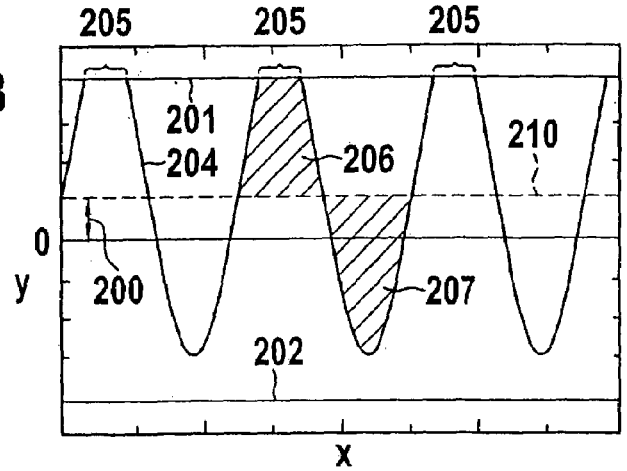
FIG. 2B shows the vibration signal of an inertial sensor having asymmetrical signal limiting.

FIG. 2B illustrates by way of example the vibration signal of an inertial sensor having asymmetrical signal limiting. The vibration signal is the result in response to high-frequency external excitation with large amplitude by accelerations acting on the sensor. The time is plotted in any units as desired on axis X. Voltage signal 111 at the output of C/U converter 110 is plotted on axis Y. Signal curve 204 results in response to high-frequency excitation of sensor element 100 with large amplitude. Such a large amplitude comes about, for example, due to the influence of external shock on the sensor with accelerations of up to a few 100 g. These accelerations occur, inter alia, as a result of the effect of spray water or gravel impact on a vehicle in which the sensor is installed. This represents a second, exceptional operating state of the sensor. Function 204 likewise has turning points which identify vibrational center position 210 of seismic mass 100. In the same way, vibrational center position 210 has offset 200 with respect to zero line 0 of the diagram. The amplitude of function 204 is limited in the regions of greatest deflection 205 to maximum value 201 by stop 101.

The essentially periodic function 204 can be divided into two half waves that are differentiated by vibrational center position 210. A first half wave has an area 206 that is bounded by center position 210, curve 204 and the line of maximum value 201. A second half wave has an area 207 that is bounded by center position 210 and curve 204. At even greater amplitude, area 207 would also be bounded by the line of maximum value 202. However, as a result of offset 200 toward maximum value 201 in this example, area 206 is always smaller than area 207. Function 204 is thus asymmetrically limited and its time average no longer corresponds to offset 200. Given compensation of offset 200 by compensation element 116 in a sensor according to FIG. 1, signal 115 is therefore not equal to zero. Thus, a signal is output which is interpreted as acceleration, although no acceleration to be normally measured is acting on the sensor.

Figure 3:
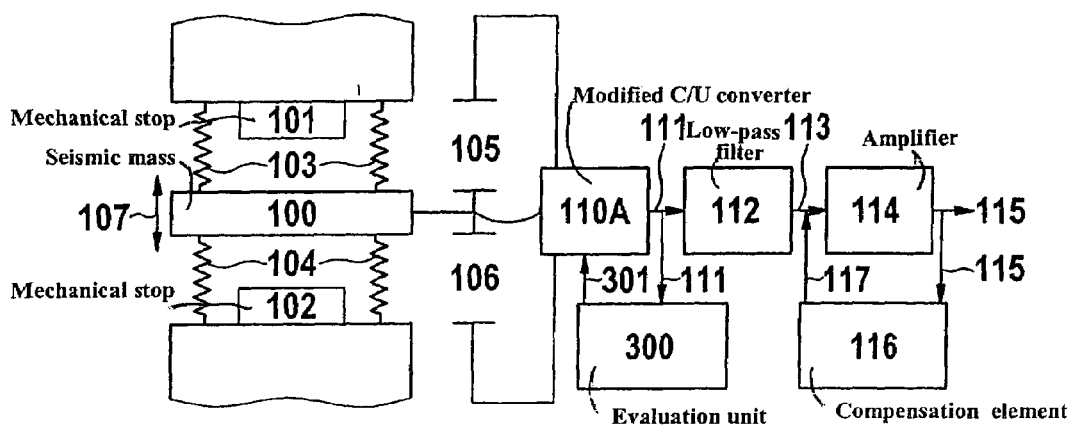
FIG. 3 shows a specific embodiment of the inertial sensor according to the present invention having symmetrical electrical signal limiting.

FIG. 3 shows a specific embodiment of the inertial sensor according to the present invention having symmetrical electrical signal limiting. In contrast to the sensor according to FIG. 1, the sensor of the present invention in this exemplary embodiment has a modified C/U converter 110A and evaluation electronics 300 which are used to electrically limit signal 111. To that end, signal 111 is supplied to evaluation electronics 300. After the sensor is switched on, offset 200 is determined in evaluation electronics 300 from signal 111, stored and converted into a manipulated variable 301 which is fed to modified C/U converter 110A. In an output stage of modified C/U converter 110A, maximum possible positive and negative amplitudes of signal 111 are provided symmetrically relative to signal center position 210. The maximum amplitude may also be provided in an adjustable manner. Based on signal center position 210, which is expressed in manipulated variable 301, and the maximum amplitude relative thereto, absolute positive and negative maximum values which signal 111 is allowed to assume are determined. The output stage of modified C/U converter 110A limits signal 111 symmetrically on this basis.

Figure 4:
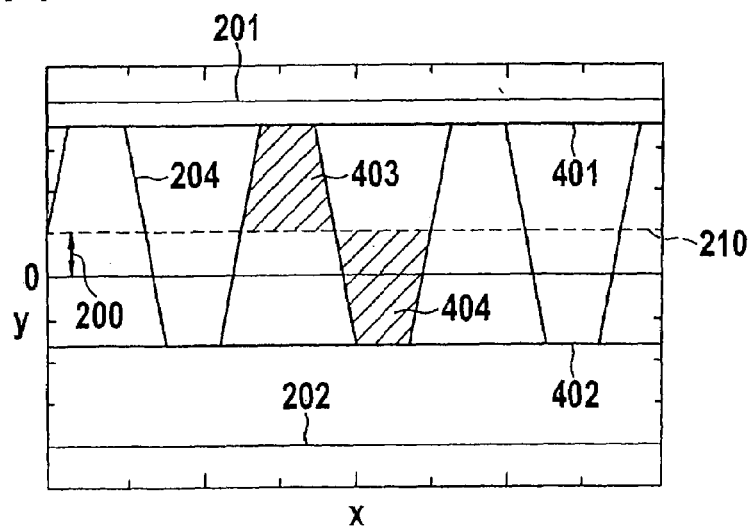
FIG. 4 shows the vibration signal of an inertial sensor according to the present invention having symmetrical electrical signal limiting.

FIG. 4 shows the vibration signal of an inertial sensor according to the present invention having symmetrical electrical signal limiting. The time is plotted in any units as desired on axis X. Voltage signal 111 at the output of modified C/U converter 110A is plotted on axis Y. Signal curve 204 results in response to high-frequency excitation of sensor element 100 with large amplitude. Signal curve 204 is limited symmetrically here by electrical limitations 401 and 402. The limitations represent the maximum possible positive and negative amplitude of signal 111. Limitations 401 and 402 have the same distance from signal center position 210, and areas 403 and 404 are therefore of equal size. Electrical limitations 401 and 402 lie within mechanical limitations 201 and 202.

Figure 5:
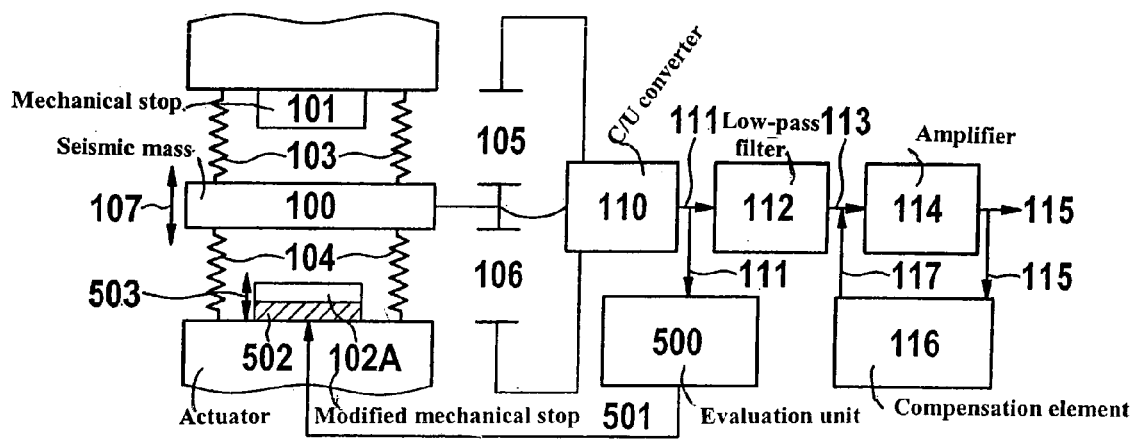
FIG. 5 shows a specific embodiment of the inertial sensor according to the present invention having symmetrical mechanical signal limiting.

FIG. 5 shows a specific embodiment of the inertial sensor according to the present invention having symmetrical mechanical signal limiting. In contrast to the sensor according to FIG. 1, the sensor of the present invention in this exemplary embodiment has evaluation electronics 500 and a modified mechanical stop 102A which are used to mechanically limit signal 111. At the beginning of sensor operation, offset 200 is compensated for in the manner described in FIGS. 1 and 2A. Moreover, signal 111 is supplied to evaluation electronics 500. From signal 111—which, given the absence of external forces, such as, for example, at the beginning of operation, is essentially determined by offset 200—evaluation electronics 500 generate a manipulated variable 501 with the aid, for example, of a mathematical function or a value table stored in a memory. Manipulated variable 501 is routed to an actuator 502, to which modified stop 102A is secured. Position 503 of modified stop 102A is adjusted by actuator 502 as a function of manipulated variable 501. Actuator 502 is used to variably position modified stop 102A along the vibration direction of actuating vibration 107 of seismic mass 100. By adjusting stop 102A as a function of offset 200, the maximum possible amplitude of signal 115 is symmetrically limited in a mechanical manner.

Figure 6:
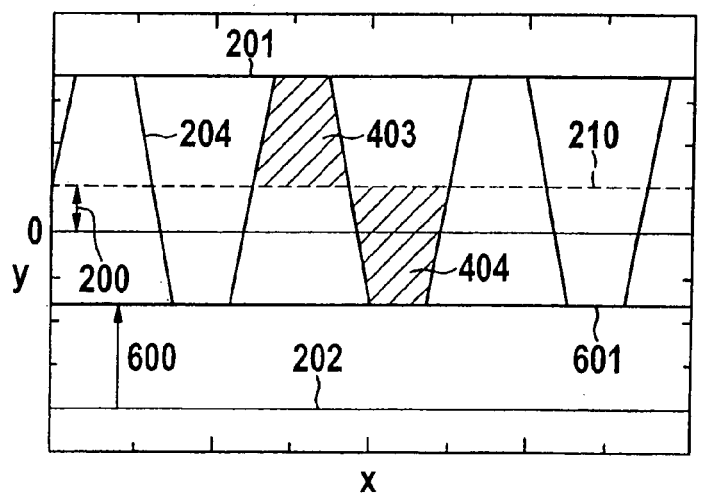
FIG. 6 shows the vibration signal of an inertial sensor according to the present invention having symmetrical mechanical signal limiting.

FIG. 6 shows the vibration signal of an inertial sensor according to the present invention having symmetrical mechanical signal limiting. The time is plotted in any units as desired on axis X. Voltage signal 111 at the output of C/U converter 110 is plotted on axis Y. Signal curve 204 results in response to excitation of sensor element 100 with high frequency and large amplitude by external forces. Signal curve 204 is symmetrically limited here in its maximum value 201 by mechanical stop 101, and in its maximum value 601 by modified mechanical stop 102A. The symmetrical limiting is achieved by the shift of maximum value 202 toward maximum value 601. Shift 600 of the maximum possible amplitude of function 204 is expression of the shift of position 503 of mechanical stop 102A. The limitations represent the maximum possible positive and negative amplitude of signal 111. Limitations 201 and 602 have the same distance from signal center position 210, and areas 403 and 404 are therefore of equal size. Maximum values 202 and 601 of electrical signal 111 are equal to the values predefined by the mechanical stops.

What is claimed is:

1. A sensor comprising:
   a seismic mass;
   at least one mechanical stop for asymmetrically limiting a deflection of the seismic mass with respect to a vibrational center position, in at least one operating mode of the sensor;
   means for detecting the deflection of the seismic mass and converting the deflection into an electrical signal; and
   means for limiting at least one maximum value of the electrical signal, the limiting being provided symmetrically in relation to the vibrational center position, the maximum value of the electrical signal not being greater than a smallest value predefined by the mechanical stop.

2. The sensor according to claim 1, further comprising means for determining a deviation of the vibrational center position of the seismic mass from a geometric center between the means for detecting.

3. The sensor according to claim 1, wherein the sensor has a micromechanical construction.

4. The sensor according to claim 1, wherein the means for detecting the deflection includes electrodes which represent a capacitive detecting element, according to the principle of differential capacitance.

5. The sensor according to claim 1, wherein the means for limiting the maximum value of the electrical signal includes an electronic evaluation circuit which electrically limits the maximum value of the electrical signal.

6. The sensor according to claim 1, further comprising a further stop, at least the further stop being positioned by the means for limiting in such a way that the deflection of the seismic mass is symmetrically limited.

7. The sensor according to claim 1, wherein the sensor is an inertial sensor.

8. The sensor according to claim 1, wherein the sensor is an acceleration sensor.

9. The sensor according to claim 1, wherein the sensor is a rotation-rate sensor.

* * * * *